Dec. 30, 1952          W. GRAY          2,623,814
PRODUCTION OF CRYSTALLINE MATERIALS
Filed Aug. 26, 1949
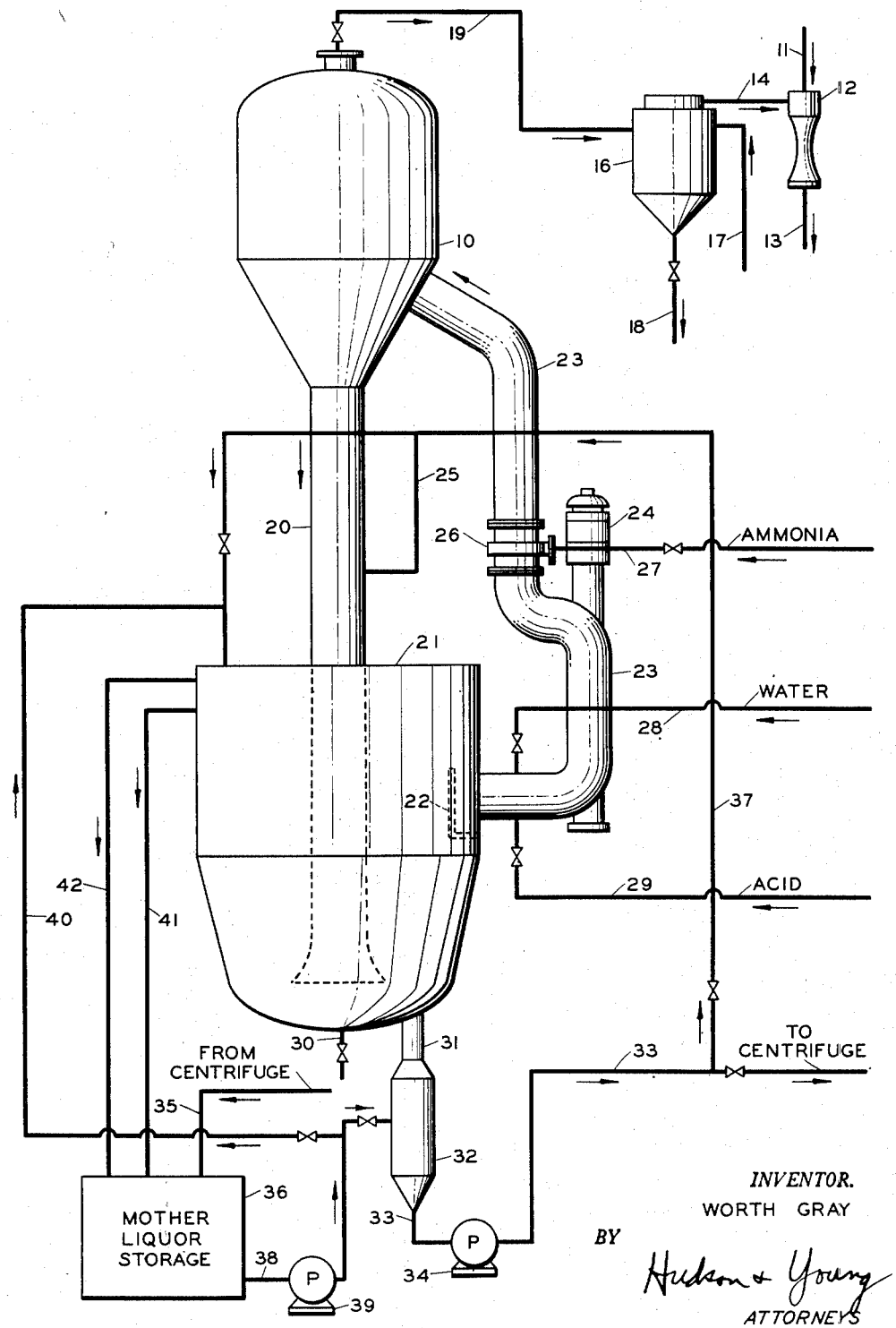
INVENTOR.
WORTH GRAY
BY
Hudson & Young
ATTORNEYS Patented Dec. 30, 1952

2,623,814

UNITED STATES PATENT OFFICE 2,623,814

PRODUCTION OF CRYSTALLINE MATERIALS

Worth Gray, Cactus, Tex., assignor to Phillips Petroleum Company, a corporation of Delaware Application August 26, 1949, Serial No. 112,589

9 Claims. (Cl. 23—301)

This invention relates to a process and apparatus for the production of crystals of organic and inorganic compounds. In one of its more specific aspects it relates to the production of crystals by evaporation of a solution containing materials which will crystallize. In a still more specific aspect it relates to improved crystallizer operation for producing ammonium salt crystals such as ammonium sulfate, ammonium nitrate, etc.

In many commercial processes for manufacturing crystalline products, the material to be crystallized is often available in a solution, such as an aqueous or alcoholic or other hydrocarbon or inorganic liquid solution. When operating in this manner the material to be crystallized must often be recovered by an evaporative crystallization process, i. e., evaporating the solvent from the material to be crystallized. Such an evaporation step may be carried out at a reduced pressure which is sufficient to cause boiling of the solution, thus removing the solvent in the form of vapor. In an apparatus for carrying out this process, a solution is passed to an evaporator wherein it is super-saturated with respect to the material to be crystallized by the evaporation of the solvent. The supersaturated liquor thus produced is pased to a suitable crystallization apparatus wherein it is contacted with previously formed crystals which relieve at least a portion of the supersaturation by causing growth thereof. The thus formed crystals are removed from the crystallizer in the form of a magma, which term is applied to a slurry of crystals and saturated mother liquor. Suitable methods for separation of the crystals from the magma, such as centrifuging, filtration, and the like, are used.

A certain amount of separation of the crystals from the mother liquor is obtained within the crystallizer thus causing the liquid in the upper portion of the crystallizer to be fairly free of crystals. This liquid, which is substantially saturated, is pumped back to the evaporator without centrifuging or other treatment for further evaporation to a point of supersaturation. The evaporator may be positioned directly over the crystallizer and connected therewith by a downcomer or barometric leg. It is through this portion of the appaartus that the supersaturated solution is carried to the crystallizer. It is apparent that since this solution is supersaturated, it may very easily be caused to throw down crystals as crystal nuclei while passing through the barometric leg. Such crystallization is known as shock crystallization. It may be caused by extreme agitation or contact with rough surfaces, or even smooth surfaces, and the like, depending on the degree of supersaturation, or by supersaturation to a point past the limit of the metastable region of the solution. Such agitation may be effected when the solution is passed through the barometric leg, thereby causing crystals to form within the leg itself causing clogging and disruption of smooth operation, as well as the formation of small crystals.

An object of this invention is to provide an improved process for the manufacture of crystals of inorganic compounds.

Another object is to provide a process whereby crystal growth rather than formation of new crystals is promoted in crystallization apparatus.

Another object of this invention is to increase the size of crystals produced in crystallization apparatus.

Another object of this invention is to provide an improved process for manufacturing crystalline materials.

Another object of this invention is to provide an improved process for the manufacture of crystalline ammonium salts such as ammonium sulfate and ammonium nitrate.

Another object of this invention is to provide a process whereby uncontrolled crystal formation in apparatus other than a crystallizer is substantially prevented.

Another object of this invention is to provide a process whereby a high rate of circulation may be maintained within a crystallization apparatus thereby eliminating salting up and plugging of such apparatus.

Another object is to provide an apparatus whereby crystallization of inorganic salts from aqueous solutions is improved.

Another object is to provide an improved apparatus for introducing a crystal magma to an evaporative crystallization apparatus to reduce uncontrolled crystallization therein.

Other objects and advantages of this invention will be apparent to one skilled in the art from the accompanying disclosure and discussion.

In accordance with my invention, a portion of magma withdrawn from a crystallizer is recycled and introduced to the barometric leg or downcomer, or conduit, through which is passed the supersaturated salt solution, connecting an evaporator with the crystallizer. By so operating, crystal growth occurs within the conduit as a result of contact of the supersaturated solution produced in the evaporator with the crystals in the recycled magma thereby causing the already formed crystals to grow rather than forming new crystal nuclei and causing crystal growth on the metallic parts of the conduit. In this manner, larger crystals of the salt may be formed and the number of crystals produced is controlled. My invention may be applied to any solution from which crystals may be formed by evaporation of the solvent, including initial crystallization or recrystallization.

The following discussion in conjunction with the attached drawing will serve to exemplify my invention and more fully disclose the process thereof. This discussion is limited to a process for the manufacture of ammonium sulfate by direct neutralization of sulfuric acid with ammonia, however, this is done to make my invention more clear and should in no way be interpreted as a limitation upon my overall process which is applicable to the production, recrystallization, or crystallization from waste liquors and the like of numerous organic or inorganic crystalline materials, e. g. adipic acid, ammonium nitrate, diammonium phosphate, sodium chloride, citric acid, hydroquinone, zinc sulfate, potassium nitrate, oxalic acid, potassium sulfate, sodium sulfate, tartaric acid, potassium nickel sulfate, thymol, potassium bichromate, copper sulfate, and other crystallizable materials.

Refer now to the attached drawing which represents one specific embodiment of my invention, the apparatus elements being shown in elevation and the flow being shown diagrammatically. Number 10 is an evaporator for removing water from an ammonium sulfate-containing liquor so as to supersaturate the liquor and remove the heat of reaction and crystallization. The evaporator may be operated at subatmospheric pressure by use of barometric condenser 16 wherein water vapor is condensed by contacting with cooling water introduced via line 17. The condensed liquid is removed from the condenser via line 18. The vapor from the evaporator is removed therefrom via line 19. Uncondensible gases such as air are removed via line 14 by aspirator 12 through which steam is passed via line 11. The gases are removed from the aspirator along with the steam via line 13.

The liquor is concentrated to supersaturation by evaporation and passed via conduit 20 which extends into crystallizer 21 to a point near to the bottom thereof. In this manner, the supersaturated ammonium sulfate solution contacts the suspension of crystals in and near the bottom of the crystallizer causing them to grow rather than forming new crystals and thus relieving the supersaturation of the solution. As the crystals grow they become heavier and settle toward the bottom of the crystallizer. The liquor after passing through the classified suspension of crystals in saturated and is relatively free of crystals. This liquor is withdrawn over weir 22 and through conduit 23 by means of pump 24, and passed upward through sparger 26 to evaporator 10 where it is again evaporated to supersaturation. Any additional water which may be necessary to remove the heat of reaction and crystallization is introduced into conduit 23 via line 28. Additional sulfuric acid is introduced to conduit 23 via line 29 and is reacted with ammonia introduced through sparger 26 to form additional ammonium sulfate, thus making the process a continuous one. Ammonia is passed to inlet 26 via line 27. Number 30 indicates a drain to be used when completely emptying the evaporation and crystallization unit.

The crystal magma, i. e., the ammonium sulfate solution carrying crystals, is withdrawn through conduit 31 and salt trap 32 and is passed through line 33 by means of magma pump 34. The magma stream is subdivided with a controlled portion being passed to a centrifuge, not shown, which separates the crystals from the mother liquor. The mother liquor thus separated is returned to storage tank 36 by line 35. The portion of magma passed to the centrifuge is controlled so as to provide an optimum crystal content for efficient operation of the centrifuge. Preferably the crystal content of the magma should be at least 35 per cent by volume and more preferably 50 per cent or more.

In accordance with my invention, the remaining portion of the magma passed via line 33 is diverted therefrom through lines 37 and 25 and introduced therefrom into conduit 20. As previously discussed, the purpose of this arrangement is to provide crystals within the conduit to relieve part of the supersaturation of the ammonium sulfate solution passing downwardly therethrough, and thus prevent any possibility of crystals forming on the walls thereof. It is within the scope of my invention to introduce the crystal magma at any point along the conduit, however, it is usually preferred to do this above the liquid level maintained within crystallizer 21. Under certain conditions it may also be preferable to introduce the crystal magma as near the top of the conduit as possible. By so operating the crystals in the magma which are the largest in the crystallizer because of classification therein are further increased in size by contacting the supersaturated solution at the top of the barometric leg, having the full length thereof to grow in, or in other words, the longest possible contact time.

It may also be desirable to recycle a portion of the magma withdrawn from salt trap 32 back to the crystallizer via lines 33 and 37 thus providing greater circulation of materials through crystallizer 21 and salt trap 32 thereby further preventing salting up in these units.

If desirable, a portion of the mother liquor separated from the crystals by the centrifuge and returned to storage tank 36 may be pumped via line 38 and pump 39 to salt trap 32 to increase the liquid content of the magma and thus prevent what is known as "salting up" in the salt trap 32. A portion of liquor passed to the salt trap passes upwardly into the crystallizer, thus functioning as an elutriating stream to produce further classification of crystals being withdrawn. A portion or all of the liquor pumped via line 38 and pump 39 is passed through line 40 back into the top of crystallizer 21. Line 41 leading from crystallizer 21 is an overflow and liquid level control line which passes excess liquor to storage tank 36. Line 42 is an emergency overflow line which also drains into storage tank 36.

The apparatus described and discussed above and shown in the attached drawing may easily be modified to adapt it for use in the crystallization of other organic or inorganic compounds, and such modification applies to my process also. Ammonium sulfate solution may be produced by the gypsum process which comprises reacting ammonium carbonate and calcium sulfate to produce ammonium sulfate and calcium carbonate, the carbonate being removed as a solid and the sulfate recovered as an aqueous liquor. When crystallizing a solution of this kind, acid and ammonia inlets 29 and 26 in conduit 23 will not be used, but instead, one inlet for ammonium sulfate solution is supplied thus providing a continuous process. The remainder of the process and apparatus are identical with that previously discussed.

When other materials are to be crystallized from solution, the same process flow as discussed in regard to ammonium sulfate produced by the gypsum process may be applicable. Or if the material to be crystallized is made within the apparatus, then an apparatus similar to that of the attached drawing may be used.

The advantages attained by the use of my invention include prevention of crystal growth on the walls of the barometric leg, increased size of crystals, and reduction in quantity of seed crystals formed. The increase in crystal size and reduction in quantity of seed crystals are interrelated. With my invention, it is possible to operate a given crystallization unit at maximum capacity because the supersaturation of the liquor per pass through the evaporator may be the maximum, i. e., up to the limit of the metastable region, without danger of shocking out additional crystal nuclei. Furthermore, it is possible to withdraw magma from the crystallizer at a uniform rate which is sufficient to prevent salting up of the magma lines and pump, while still providing a means for supplying the centrifuge or other crystal separation means with a magma having the preferred crystal content.

I claim:

1. An improved process for the manufacture of crystalline material by evaporative crystallization which comprises evaporating a solution containing crystallizable material to supersaturation, passing thus prepared supersaturated solution to a crystallization zone through a barometric leg connecting said evaporating and said crystallization zone, said supersaturated solution being contacted in said crystallization zone with previously formed crystals thus relieving supersaturation thereof and causing said crystals to grow, removing crystals from said crystallization zone as a crystal magma, and passing a portion of thus removed magma back to said barometric leg.

2. An improved process for the manufacture of crystalline organic and inorganic materials by evaporative crystallization which comprises evaporating a solution containing crystallizable materials to supersaturation in an evaporation zone, passing thus prepared supersaturated solution downwardly to a crystallization zone therebelow through a barometric leg connecting said evaporating and said crystallization zone, said supersaturated solution being contacted in said crystallization zone with previously formed crystals thus relieving supersaturation thereof and causing said crystals to grow, removing crystals from said crystallization zone as a crystal magma and passing a portion of thus removed magma to a separation zone wherein crystals are removed from the mother liquor, recycling said mother liquor to said crystallization zone, passing another portion of said magma removed from said crystallizer to said barometric leg, introducing same into said supersaturated solution passing therethrough and thereby relieving supersaturation of said solution and causing crystals in said magma to grow, and passing mother liquor substantially free from crystals from said crystallization zone back to said evaporation zone wherein said mother liquor is evaporated to supersaturation.

3. A process according to claim 2 wherein the solution is of an inorganic salt.

4. A process according to claim 2 wherein the solution is of an ammonium salt.

5. A process according to claim 2 wherein the solution is an aqueous solution of ammonium sulfate.

6. In a process for the manufacture of crystalline materials by crystallization from a solution comprising the evaporation of a solution containing a crystallizable material at reduced pressure in an evaporation zone, passing thus formed supersaturated solution downwardly to a crystallization zone therebelow through a barometric leg connecting said evaporating and said crystallization zone, said supersaturation being relieved in said crystallization zone and crystals of the crystallizable material formed, removing a crystal magma containing the largest of the crystals formed from said crystallizer, separating thus removed magma and recovering crystals therefrom, passing mother liquor from said separation back to said crystallization zone, passing mother liquor from said crystallization zone substantially free of crystals back to said evaporation zone wherein said solution is evaporated until supersaturated: the improvement which comprises introducing a portion of the magma removed from said crystallization zone into said barometric leg through which said supersaturated solution is passed from said evaporation zone to said crystallization zone, and thereby relieving supersaturation of said solution by contacting said crystals and thereby also causing crystal growth.

7. A process according to claim 6 wherein said solution of crystallizable material is an aqueous solution of ammonium sulfate.

8. An apparatus for the manufacture of crystalline materials which comprises an evaporator having a tube connected thereto for drawing off vapors from said evaporator, means connected to said tube for reducing pressure in said evaporator, a crystallization zone positioned below said evaporator, a barometric leg connecting the lower portion of said evaporator and said crystallization zone and opening near the bottom of said crystallization zone for downward passage of said rich mother liquor from said evaporator to said crystallization zone, a recycling pipe connecting the upper portion of said crystallization zone and said evaporator for recycling mother liquor poor in material to be crystallized from said upper portion of said crystallization zone back to said evaporator, means in said recycle pipe for introducing reactants for the production of said mother liquor, an outlet near the bottom of said crystallization zone for removal of crystals therefrom in the form of a magma, a conduit for recycling a portion of said magma back to said barometric leg, means for separating another portion of said magma into crystals and mother liquor so that said separated mother liquor can be recycled back to said crystallization zone.

9. An apparatus according to claim 8 wherein said conduit for recycling a portion of said magma introduces said magma near the top of said barometric leg.

WORTH GRAY.

REFERENCES CITED

The following references are of record in the file of this patent:

UNITED STATES PATENTS

| Number | Name | Date |
| --- | --- | --- |
| 1,860,741 | Jeremiassen | May 31, 1932 |
| 1,976,936 | Harms | Oct. 17, 1934 |
| 2,042,661 | Jeremiassen | June 2, 1936 |
| 2,130,065 | Burke | Sept. 13, 1938 |
| 2,164,112 | Jeremiassen | June 27, 1939 |
| 2,330,221 | Kermer | Sept. 28, 1943 |
| 2,347,073 | Beekhuis | Apr. 18, 1944 |